United States Patent
Liu et al.

(10) Patent No.: US 10,218,473 B2
(45) Date of Patent: Feb. 26, 2019

(54) CONTROL CHANNEL DETECTION METHOD, USER EQUIPMENT, AND BASE STATION

(71) Applicant: Huawei Technologies Co., Ltd., Shenzhen, Guangdong (CN)

(72) Inventors: Kunpeng Liu, Beijing (CN); Liang Xia, Shenzhen (CN); Jianghua Liu, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 151 days.

(21) Appl. No.: 14/702,360

(22) Filed: May 1, 2015

(65) Prior Publication Data
US 2015/0236826 A1    Aug. 20, 2015

Related U.S. Application Data

(63) Continuation of application No. PCT/CN2012/083935, filed on Nov. 1, 2012.

(51) Int. Cl.
*H04W 72/04*    (2009.01)
*H04W 24/10*    (2009.01)
*H04L 5/00*    (2006.01)

(52) U.S. Cl.
CPC ......... *H04L 5/0035* (2013.01); *H04W 72/044* (2013.01)

(58) Field of Classification Search
CPC ..... H04L 5/0035; H04L 5/005; H04L 5/0094; H04L 5/0023; H04L 5/0091; H04W 48/16; H04W 72/1231; H04W 72/044; H04W 28/20; H04W 72/042
USPC ........................................................ 370/329
See application file for complete search history.

(56) References Cited

U.S. PATENT DOCUMENTS

| | | | |
|---|---|---|---|
| 2009/0003274 A1* | 1/2009 | Kwak | H04W 72/042 370/329 |
| 2009/0207797 A1* | 8/2009 | Shen | H04L 5/0053 370/329 |
| 2011/0038310 A1* | 2/2011 | Chmiel | H04L 27/2613 370/328 |
| 2011/0136495 A1 | 6/2011 | Chen et al. | |
| 2011/0317657 A1* | 12/2011 | Chmiel | H04L 5/001 370/331 |
| 2012/0087299 A1* | 4/2012 | Bhattad | H04L 5/0053 370/315 |
| 2012/0106478 A1 | 5/2012 | Han et al. | |

(Continued)

FOREIGN PATENT DOCUMENTS

| | | |
|---|---|---|
| CN | 101651890 A | 2/2010 |
| CN | 101742655 A | 6/2010 |

(Continued)

*Primary Examiner* — Edan Orgad
*Assistant Examiner* — Vanneilian Lalchinthang

(57) ABSTRACT

Embodiments of the present invention provide a control channel detection method, a user equipment, and a base station, where the method includes: acquiring parameter configuration information corresponding to different control channel resource sets, and detecting a control channel in the corresponding different control channel resource sets according to the parameter configuration information, which therefore implements selection of a dynamic node.

32 Claims, 5 Drawing Sheets

(56) References Cited

U.S. PATENT DOCUMENTS

| | | | | |
|---|---|---|---|---|
| 2013/0034064 A1* | 2/2013 | Nam | ............... | H04W 72/1294 370/329 |
| 2013/0044707 A1* | 2/2013 | Chen | ............... | H04W 72/1231 370/329 |
| 2013/0208604 A1* | 8/2013 | Lee | ............... | H04L 25/0226 370/252 |
| 2013/0242886 A1* | 9/2013 | Chen | ............... | H04W 52/243 370/329 |
| 2013/0301562 A1* | 11/2013 | Liao | ............... | H04W 72/042 370/329 |
| 2013/0315197 A1* | 11/2013 | Park | ............... | H04W 72/042 370/329 |
| 2014/0226582 A1* | 8/2014 | Zeng | ............... | H04B 7/0626 370/329 |

FOREIGN PATENT DOCUMENTS

| | | | |
|---|---|---|---|
| CN | 102740473 A | 10/2012 | |
| WO | WO 2012/109542 A1 | 8/2012 | |

\* cited by examiner

| 0 | 12 | 8 | 4 | 0 | | | 8 | 4 | 0 | 12 | 8 | | |
|---|----|---|---|---|---|---|---|---|---|----|---|---|---|
| 1 | 13 | 9 | 5 | 1 | | | 9 | 5 | 1 | 13 | 9 | | |
| 2 | 14 | 10 | 6 | 2 | 12 | 2 | 10 | 6 | 2 | 14 | 10 | 4 | 10 |
| 3 | 15 | 11 | 7 | 3 | 13 | 3 | 11 | 7 | 3 | 15 | 11 | 5 | 11 |
| 4 | 0 | 12 | 8 | 4 | 14 | 4 | 12 | 8 | 4 | 0 | 12 | 6 | 12 |
| 5 | 1 | 13 | 9 | 5 | | | 13 | 9 | 5 | 1 | 13 | | |
| 6 | 2 | 14 | 10 | 6 | | | 14 | 10 | 6 | 2 | 14 | | |
| 7 | 3 | 15 | 11 | 7 | 15 | 5 | 15 | 11 | 7 | 3 | 15 | 7 | 13 |
| 8 | 4 | 0 | 12 | 8 | 0 | 6 | 0 | 12 | 8 | 4 | 0 | 8 | 14 |
| 9 | 5 | 1 | 13 | 9 | 1 | 7 | 1 | 13 | 9 | 5 | 1 | 9 | 15 |
| 10 | 6 | 2 | 14 | 10 | | | 2 | 14 | 10 | 6 | 2 | | |
| 11 | 7 | 3 | 15 | 11 | | | 3 | 15 | 11 | 7 | 3 | | |

CONTROL CHANNEL DETECTION METHOD, USER EQUIPMENT, AND BASE STATION

CROSS-REFERENCE TO RELATED APPLICATIONS

This application is a continuation of International Application No. PCT/CN2012/083935, filed on Nov. 1, 2012, which is hereby incorporated by reference in its entirety.

TECHNICAL FIELD

The present invention relates to communications technologies, and in particular, to a control channel detection method, a user equipment, and a base station.

BACKGROUND

With development of communications technologies and large-scale deployment of heterogeneous networks, a physical downlink control channel (Physical Downlink Control channel, hereinafter referred to as PDCCH) faces great challenges in aspects of a capacity, coverage, an interference coordination capability, and the like.

An enhanced physical downlink control channel (Enhanced Physical Downlink Control channel, hereinafter referred to as EPDCCH) comes into being. For the EPDCCH, K control channel resource sets may be configured for each user equipment (User Equipment, hereinafter referred to as UE), where K is a positive integer greater than or equal to 1. In the prior art, a parameter of a control channel resource set is configured by using specific signaling of a UE.

However, when the EPDCCH is applied to a coordinated multiple point transmission and reception (Coordinated Multiple Point transmission and reception, hereinafter referred to as CoMP) technology, a dynamic node cannot be selected when the parameter is configured for the control channel resource set of the UE according to the prior art and configurations of the K control channel resource sets are the same.

SUMMARY

Embodiments of the present invention provide a control channel detection method, a user equipment, and a base station, so as to implement selection of a dynamic node in CoMP.

According to a first aspect, a control channel detection method is provided, including:

acquiring parameter configuration information corresponding to different control channel resource sets; and detecting a control channel in the corresponding different control channel resource sets according to the parameter configuration information.

With reference to the first aspect, the acquiring parameter configuration information corresponding to different control channel resource sets includes:

receiving the parameter configuration information corresponding to the different control channel resource sets that is sent by a base station, where the parameter configuration information includes at least one type of the following information:

pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information; and performing rate de-matching according to the ZP CSI-RS configuration information.

With reference to the first aspect, the acquiring parameter configuration information corresponding to different control channel resource sets includes:

acquiring, according to an index number of the control channel resource set and/or an index number of a first physical resource block PRB of the control channel resource set, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the first aspect, the acquiring parameter configuration information corresponding to different control channel resource sets includes:

receiving demodulation pilot sequence initialization identities IDs that are sent by a base station and are corresponding to the different control channel resource sets; and acquiring, according to the demodulation pilot sequence initialization IDs, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the first aspect, the acquiring parameter configuration information corresponding to different control channel resource sets includes:

receiving ZP CSI-RS configuration information and/or NZP CSI-RS configuration information sent by the base station and corresponding to the different control channel resource sets; and acquiring, according to the ZP CSI-RS configuration information and/or the NZP CSI-RS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the first aspect, the acquiring parameter configuration information corresponding to different control channel resource sets includes:

receiving cell-specific reference signal CRS configuration information corresponding to the different control channel resource sets that is sent by a base station; and acquiring, according to the CRS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the first aspect, the subframe configuration information includes at least one type of the following information:

indication information that blind detection is performed in a configured subframe on search space of a first control channel or a second control channel in each control channel resource set;

special subframe configuration information;

time division duplex TDD uplink-downlink subframe configuration information;

information about a subframe in which a positioning pilot is located; and information about a subframe in which a multicast channel is located.

With reference to the first aspect, the detecting a control channel in the corresponding different control channel resource sets according to the parameter configuration information includes:

if detection, in a current subframe, of UE specific search space of the first control channel is configured in subframe configuration information of each of two control channel resource sets, detecting a candidate control channel of the first control channel in both of the two control channel resource sets, where each control channel resource set has at least one candidate control channel of the first control channel; and if detection, in the subframe, of UE specific search space of the second control channel is configured in the subframe configuration information of each of the two control channel resource sets, performing detection in the UE specific search space of the second control channel.

With reference to the first aspect, the detecting a control channel in the corresponding different control channel resource sets according to the parameter configuration information includes:

if detection, in a current subframe, of UE specific search space of the first control channel is configured in subframe configuration information of a first control channel resource set and detection, in a current subframe, of UE specific search space of the second control channel is configured in subframe configuration information of a second control channel resource set, performing detection in the UE specific search space of the first control channel in the first control channel resource set, and performing detection in the UE specific search space of the second control channel in the second control channel resource set, where there is at least one candidate control channel in the UE specific search space of the first control channel, there is at least one candidate control channel in the UE specific search space of the second control channel, and the total number of candidate control channels in the UE specific search space of the first control channel and the second control channel is not greater than the total number of candidate control channels in UE specific search space.

With reference to the first aspect, the detecting a control channel in the corresponding different control channel resource sets according to the parameter configuration information includes:

if detection, in a current subframe, of UE specific search space of the first control channel is configured in subframe configuration information of a first control channel resource set and detection, in a current subframe, of UE specific search space of the second control channel is configured in subframe configuration information of a second control channel resource set, performing detection in the UE specific search space of the first control channel in the first control channel resource set, where the number of candidate control channels in the UE specific search space of the first control channel is greater than 1 and is less than the total number of candidate control channels in UE specific search space.

With reference to the first aspect, the detecting a control channel in the corresponding different control channel resource sets according to the parameter configuration information includes:

if detection, in a current subframe, of UE specific search space of the first control channel is configured in subframe configuration information of a first control channel resource set and detection, in a current subframe, of UE specific search space of the second control channel is configured in subframe configuration information of a second control channel resource set, performing detection in the UE specific search space of the first control channel in the first control channel resource set, where the number of candidate control channels in the UE specific search space of the first control channel is equal to the total number of candidate control channels in UE specific search space.

With reference to the first aspect, the first control channel is an enhanced physical downlink control channel EPDCCH, and the second control channel is a physical downlink control channel PDCCH.

With reference to the first aspect, the acquiring parameter configuration information corresponding to different control channel resource sets includes:

receiving broadcast signaling or RRC signaling that is sent by the base station and includes the parameter configuration information.

According to a second aspect, a control channel detection method is provided, including:

determining parameter configuration information of a control channel resource set; and sending the parameter configuration information to a user equipment UE, so that the UE detects a control channel in corresponding different control channel resource sets according to the parameter configuration information.

With reference to the second aspect, the determining parameter configuration information of a control channel resource set includes:

determining at least one type of the following information corresponding to the control channel resource set:

pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information.

With reference to the second aspect, the determining parameter configuration information of a control channel resource set includes:

determining a demodulation pilot sequence initialization identity ID corresponding to the control channel resource set.

With reference to the second aspect, the determining parameter configuration information of a control channel resource set includes:

determining a ZP CSI-RS configuration parameter and/or an NZP CSI-RS configuration parameter corresponding to the control channel resource set.

With reference to the second aspect, the determining parameter configuration information of a control channel resource set includes:

determining a cell-specific reference signal CRS configuration parameter corresponding to the control channel resource set.

With reference to the second aspect, the subframe configuration information includes at least one type of the following information:

indication information that blind detection is performed in a configured subframe on search space of a first control channel or a second control channel in each control channel resource set;

special subframe configuration information;

time division duplex TDD uplink-downlink subframe configuration information;

information about a subframe in which a positioning pilot is located; and information about a subframe in which a multicast channel is located.

With reference to the second aspect, the sending the parameter configuration information to a UE includes:

sending broadcast signaling or RRC signaling including the parameter configuration information to the UE.

According to a third aspect, a user equipment is provided, including:

an acquiring module, configured to acquire parameter configuration information corresponding to different control channel resource sets; and a detection module, configured to detect a control channel in the corresponding different control channel resource sets according to the parameter configuration information.

With reference to the third aspect, the acquiring module is specifically configured to: receive the parameter configuration information corresponding to the different control channel resource sets that is sent by a base station, where the parameter configuration information includes at least one type of the following information:

pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information; and perform rate de-matching according to the ZP CSI-RS configuration information.

With reference to the third aspect, the acquiring module is specifically configured to acquire, according to an index number of the control channel resource set and/or an index number of a first physical resource block PRB of the control channel resource set, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the third aspect, the acquiring module is specifically configured to: receive demodulation pilot sequence initialization identities IDs that are sent by a base station and are corresponding to the different control channel resource sets; and acquire, according to the demodulation pilot sequence initialization IDs, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the third aspect, the acquiring module is specifically configured to: receive ZP CSI-RS configuration information and/or NZP CSI-RS configuration information sent by a base station and corresponding to the different control channel resource sets; and acquire, according to the ZP CSI-RS configuration information and/or the NZP CSI-RS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the third aspect, the acquiring module is specifically configured to: receive cell-specific reference signal CRS configuration information corresponding to the different control channel resource sets that is sent by a base station; and acquire, according to the CRS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the third aspect, the subframe configuration information includes at least one type of the following information:

indication information that blind detection is performed in a configured subframe on search space of a first control channel or a second control channel in each control channel resource set;

special subframe configuration information;

time division duplex TDD uplink-downlink subframe configuration information;

information about a subframe in which a positioning pilot is located; and information about a subframe in which a multicast channel is located.

With reference to the third aspect, the detection module is specifically configured to: if detection, in a current subframe, of UE specific search space of the first control channel is configured in subframe configuration information of each of two control channel resource sets, detect a candidate control channel of the first control channel in both of the two control channel resource sets, where each control channel resource set has at least one candidate control channel of the first control channel; and the detection module is specifically configured to: if detection, in the subframe, of UE specific search space of the second control channel is configured in the subframe configuration information of each of the two control channel resource sets, perform detection in the UE specific search space of the second control channel.

With reference to the third aspect, the detection module is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, and perform detection in the UE specific search space of the second control channel in the second control channel resource set, where there is at least one candidate control channel in the UE specific search space of the first control channel, there is at least one candidate control channel in the UE specific search space of the second control channel, and the total number of candidate control channels in the UE specific search space of the first control channel and the second control channel is not greater than the total number of candidate control channels in UE specific search space.

With reference to the third aspect, the detection module is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, where the number of candidate control channels in the UE specific search space of the first control channel is greater than 1 and is less than the total number of candidate control channels in UE specific search space.

With reference to the third aspect, the detection module is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, where the number of candidate control channels in the UE specific search space of the first control channel is equal to the total number of candidate control channels in UE specific search space.

With reference to the third aspect, the first control channel is an enhanced physical downlink control channel EPDCCH, and the second control channel is a physical downlink control channel PDCCH.

With reference to the third aspect, the acquiring module is specifically configured to receive broadcast signaling or RRC signaling that is sent by the base station and includes the parameter configuration information.

According to a fourth aspect, a base station is provided, including:
a determining module, configured to determine parameter configuration information of a control channel resource set; and
a sending module, configured to send the parameter configuration information to a user equipment UE, so that the UE detects a control channel in corresponding different control channel resource sets according to the parameter configuration information.

With reference to the fourth aspect, the determining module is specifically configured to determine at least one type of the following information corresponding to the control channel resource set:
pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information; and With reference to the fourth aspect, the determining module is specifically configured to determine a demodulation pilot sequence initialization identity ID corresponding to the control channel resource set.

With reference to the fourth aspect, the determining module is specifically configured to determine a ZP CSI-RS configuration parameter and/or an NZP CSI-RS configuration parameter corresponding to the control channel resource set.

With reference to the fourth aspect, the determining module is specifically configured to determine a cell-specific reference signal CRS configuration parameter corresponding to the control channel resource set.

With reference to the fourth aspect, the subframe configuration information includes at least one type of the following information:
indication information that blind detection is performed in a configured subframe on search space of a first control channel or a second control channel in each control channel resource set;
special subframe configuration information;
time division duplex TDD uplink-downlink subframe configuration information;
information about a subframe in which a positioning pilot is located; and
information about a subframe in which a multicast channel is located.

With reference to the fourth aspect, the sending module is specifically configured to send broadcast signaling or RRC signaling including the parameter configuration information to the UE.

According to a fifth aspect, a user equipment is provided, including:
an acquirer, configured to acquire parameter configuration information corresponding to different control channel resource sets; and
a detector, configured to detect a control channel in the corresponding different control channel resource sets according to the parameter configuration information.

With reference to the fifth aspect, the acquirer is specifically configured to: receive parameter configuration information corresponding to the different control channel resource sets that is sent by a base station, where
the parameter configuration information includes at least one type of the following information:
pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information; and
perform rate de-matching according to the ZP CSI-RS configuration information.

With reference to the fifth aspect, the acquirer is specifically configured to acquire, according to an index number of the control channel resource set and/or an index number of a first physical resource block PRB of the control channel resource set, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the fifth aspect, the acquirer is specifically configured to: receive demodulation pilot sequence initialization identities IDs that are sent by the base station and are corresponding to the different control channel resource sets; and acquire, according to the demodulation pilot sequence initialization IDs, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the fifth aspect, the acquirer is specifically configured to: receive ZP CSI-RS configuration information and/or NZP CSI-RS configuration information sent by the base station and corresponding to the different control channel resource sets; and acquire, according to the ZP CSI-RS configuration information and/or the NZP CSI-RS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the fifth aspect, the acquirer is specifically configured to: receive cell-specific reference signal CRS configuration information corresponding to the different control channel resource sets that is sent by the base station; and acquire, according to the CRS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

With reference to the fifth aspect, the subframe configuration information includes at least one type of the following information:

indication information that blind detection is performed in a configured subframe on search space of a first control channel or a second control channel in each control channel resource set;

special subframe configuration information;

time division duplex TDD uplink-downlink subframe configuration information;

information about a subframe in which a positioning pilot is located; and information about a subframe in which a multicast channel is located.

With reference to the fifth aspect, the detector is specifically configured to: if detection, in a current subframe, of UE specific search space of the first control channel is configured in subframe configuration information of each of two control channel resource sets, detect a candidate control channel of the first control channel in both of the two control channel resource sets, where each control channel resource set has at least one candidate control channel of the first control channel; and the detector is specifically configured to: if detection, in the subframe, of UE specific search space of the second control channel is configured in the subframe configuration information of each of the two control channel resource sets, perform detection in the UE specific search space of the second control channel.

With reference to the fifth aspect, the detector is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, and perform detection in the UE specific search space of the second control channel in the second control channel resource set, where there is at least one candidate control channel in the UE specific search space of the first control channel, there is at least one candidate control channel in the UE specific search space of the second control channel, and the total number of candidate control channels in the UE specific search space of the first control channel and the second control channel is not greater than the total number of candidate control channels in UE specific search space.

With reference to the fifth aspect, the detector is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, where the number of candidate control channels in the UE specific search space of the first control channel is greater than 1 and is less than the total number of candidate control channels in UE specific search space.

With reference to the fifth aspect, the detector is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, where the number of candidate control channels in the UE specific search space of the first control channel is equal to the total number of candidate control channels in UE specific search space.

With reference to the fifth aspect, the first control channel is an enhanced physical downlink control channel EPDCCH, and the second control channel is a physical downlink control channel PDCCH.

With reference to the fifth aspect, the acquirer is specifically configured to receive broadcast signaling or RRC signaling that is sent by the base station and includes the parameter configuration information.

According to a sixth aspect, a base station is provided, including:

a processor, configured to determine parameter configuration information of a control channel resource set; and a sender, configured to send the parameter configuration information to a user equipment UE, so that the UE detects a control channel in corresponding different control channel resource sets according to the parameter configuration information.

With reference to the sixth aspect, the processor is specifically configured to determine at least one type of the following information corresponding to the control channel resource set:

pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information.

With reference to the sixth aspect, the processor is specifically configured to determine a demodulation pilot sequence initialization identity ID corresponding to the control channel resource set.

With reference to the sixth aspect, the processor is specifically configured to determine a ZP CSI-RS configuration parameter and/or an NZP CSI-RS configuration parameter corresponding to the control channel resource set.

With reference to the sixth aspect, the processor is specifically configured to determine a cell-specific reference signal CRS configuration parameter corresponding to the control channel resource set.

With reference to the sixth aspect, the subframe configuration information includes at least one type of the following information:

indication information that blind detection is performed in a configured subframe on search space of a first control channel or a second control channel in each control channel resource set;

special subframe configuration information;

time division duplex TDD uplink-downlink subframe configuration information;

information about a subframe in which a positioning pilot is located; and information about a subframe in which a multicast channel is located.

With reference to the sixth aspect, the sender is specifically configured to send broadcast signaling or RRC signaling including the parameter configuration information to the UE.

According to the control channel detection method, the user equipment, and the base station in the embodiments of the present invention, the UE acquires parameter configuration information corresponding to different control channel resource sets, and detects a control channel in the corresponding different control channel resource sets according to the parameter configuration information. Because different control channel resource sets correspond to different parameter configuration information, a control channel can be detected in the corresponding different control channel resource sets according to the different parameter configuration information, which therefore implements selection of a dynamic node.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
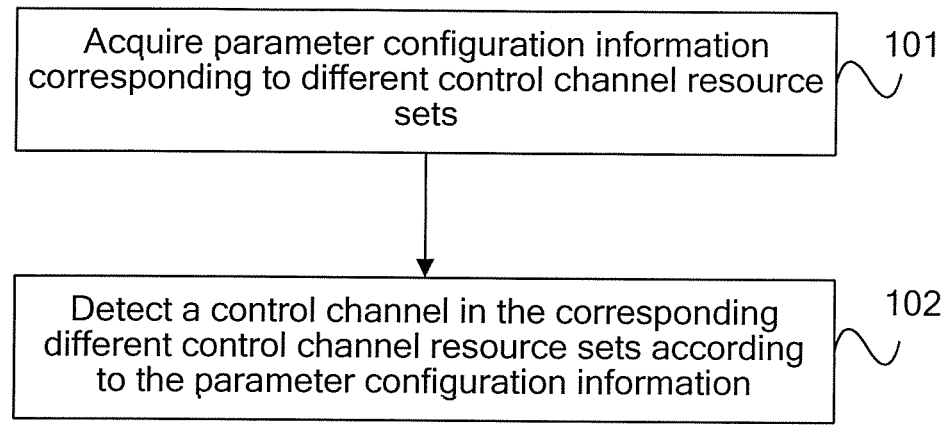
FIG. 1 is a schematic flowchart of Embodiment 1 of a control channel detection method according to the present invention.

FIG. 1 is a schematic flowchart of Embodiment 1 of a control channel detection method according to the present invention. As shown in FIG. 1, steps of this embodiment include:

S101: Acquire parameter configuration information corresponding to different control channel resource sets.

Specifically, in a CoMP communications system, 2 control channel resource sets for each UE are configured on a network side, which are, for example, a set set0 and a set set1 separately. Each control channel resource set includes at least one physical resource block (Physical Resource Block, hereinafter referred to as PRB), each PRB includes multiple enhanced control channel elements (Enhanced Control Channel Element, hereinafter referred to as ECCE), each ECCE includes multiple enhanced resource element groups (Enhanced Resource Element Group, hereinafter referred to as EREG), and each EREG includes multiple physical resource elements (Resource Element, hereinafter referred to as RE).

A UE may acquire the parameter configuration information corresponding to the different control channel resource sets in multiple manners, for example: by receiving the parameter configuration information that is sent by a base station and is corresponding to the control channel resource sets; or by receiving specific parameters that are sent by a base station and are corresponding to the different control channel resource sets, where the specific parameters may be, for example, demodulation pilot sequence initialization identities (Identity, hereinafter referred to as ID), and may also be zero power channel state information-reference signal (Zero Power Channel State Information-Reference Signal, hereinafter referred to as ZP CSI-RS) configuration information and/or non zero power channel state information-reference signal (Non Zero Power Channel State Information-Reference Signal, hereinafter referred to as NZP CSI-RS) configuration information, and acquiring the parameter configuration information corresponding to the different control channel resource sets according to the foregoing specific parameters; or by acquiring the parameter configuration information corresponding to the different control channel resource sets according to an index number of the control channel resource set and/or an index number of a first physical resource block PRB of the control channel resource set.

Step S101 is described below in detail by using several specific implementation manners.

As a first feasible implementation manner, a UE may receive the parameter configuration information that is sent by a base station and is corresponding to the different control channel resource sets, where the parameter configuration information includes at least one type of the following information: pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information; and rate de-matching is performed according to the ZP CSI-RS configuration information.

Specifically, the parameter configuration information may be obtained by receiving broadcast signaling or RRC signaling that is sent by the base station and includes at least one type of the parameter configuration information.

As a second feasible implementation manner, a UE may receive cell-specific reference signal (Cell-specific Reference Signal, hereinafter referred to as CRS) configuration information that is sent by a base station and is corresponding to the different control channel resource sets; and acquire, according to the CRS configuration information, at least one type of the following information corresponding to the different control channel resource sets: pilot port information, information about a mapping relationship between an enhanced control channel element and an enhanced resource element group, and information about a mapping relationship between an enhanced resource element group and a resource element.

Specifically, a demodulation reference signal (Demodulation Reference Signal, hereinafter referred to as DMRS) pilot port of a control channel, which performs discrete transmission, in each control channel resource set of the control channel is obtained according to the CRS configuration information that is configured for each control channel resource set, that is, the pilot port used by the control channel that performs discrete transmission is a function in the CRS configuration information, where the CRS configuration information includes an offset of a CRS frequency.

Figure 2:
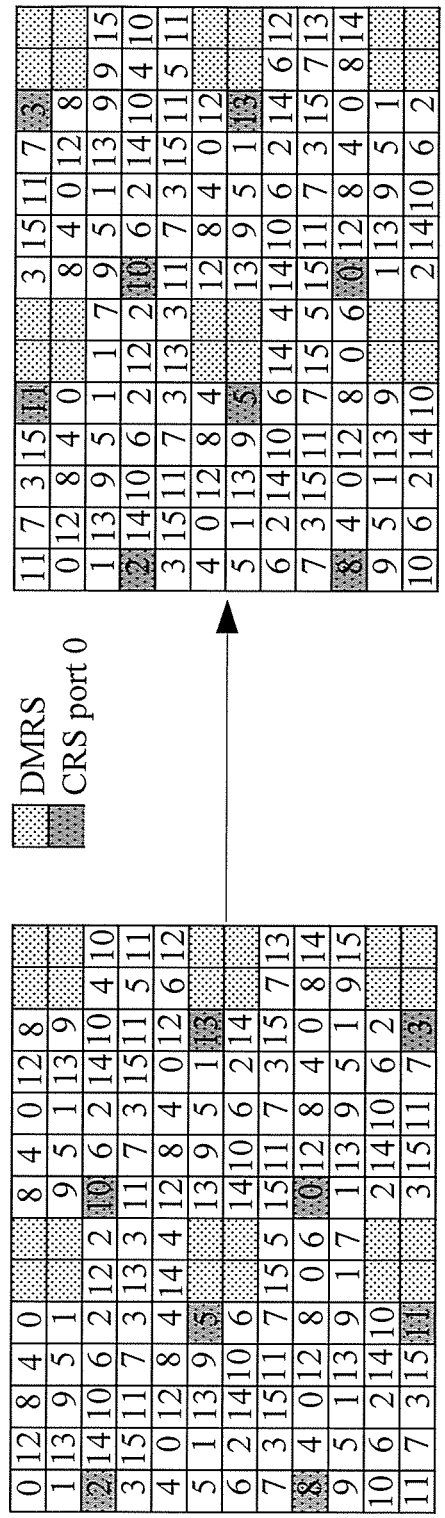
FIG. 2 is a schematic diagram showing a mapping relationship that is obtained by using CRS configuration information and is between an enhanced resource element group and a resource element according to Embodiment 1 of the present invention.

The information about a mapping relationship between an enhanced resource element group and a resource element of each control channel resource set is obtained according to the CRS configuration information, which specifically indicates that the information about a mapping relationship between an enhanced resource element group and a resource element is obtained by means of a cyclic shift according to the CRS configuration information. FIG. 2 is a schematic diagram showing a mapping relationship that is obtained by using CRS configuration information and is between an enhanced resource element group and a resource element according to Embodiment 1 of the present invention. As shown in FIG. 2, in each PRB, each row represents one subcarrier, each column represents one orthogonal frequency division multiplexing (Orthogonal Frequency Division Multiplexing, hereinafter referred to as OFDM) symbol, and EREG sequence numbers are successively mapped to each PRB in a sequence of frequency domain first and then time domain; in the left figure, mapping starts from EREG0, that is, from the first position. Using an offset in the frequency domain of the obtained CRS configuration information of each control channel resource set as a first parameter and with regard to the left figure in FIG. 2, a cyclic shift by one CRS is performed during mapping from an EREG to an RE. The cyclic shift may be performed in each OFDM symbol. It can be seen in the right figure that, in the first column, mapping of an EREG sequence number moves downwards by one bit, that is, a position of EREG0 shifts to the second subcarrier. From the left figure to the right figure in FIG. 2, there is an offset in a position of the CRS, and mapping from an EREG to an RE also shifts correspondingly, so that EREG serial numbers of positions occupied by CRS ports 0 are the same.

Figure 3:
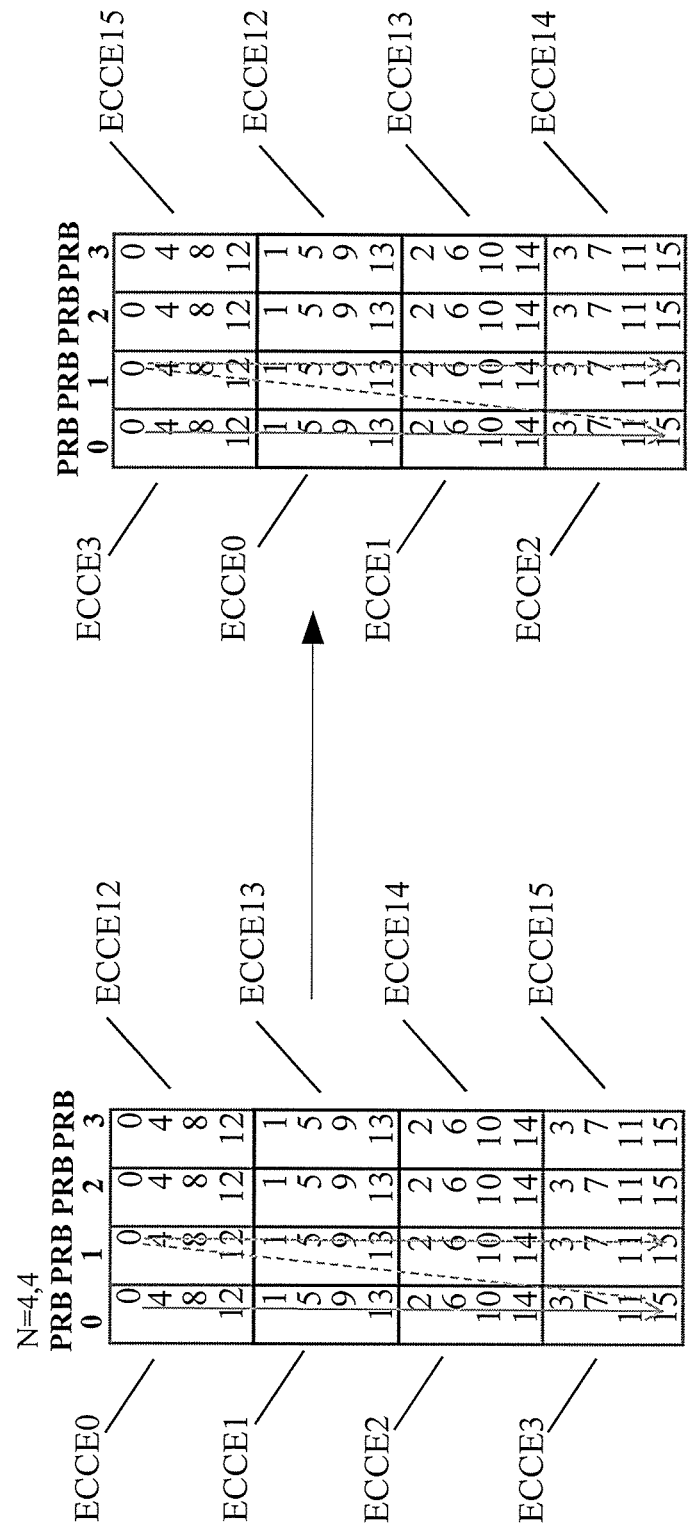
FIG. 3 is a schematic diagram showing a mapping relationship that is obtained by using CRS configuration information and is between an enhanced control channel element and an enhanced resource element group according to Embodiment 1 of the present invention.

The information about a mapping relationship between an enhanced control channel element and an enhanced resource element group of each control channel resource set is obtained according to the CRS configuration information. FIG. 3 is a schematic diagram showing a mapping relationship that is obtained by using CRS configuration information and is between an enhanced control channel element and an enhanced resource element group according to Embodiment 1 of the present invention. As shown in FIG. 3, in the left figure, ECCE0 includes EREG0, EREG4, EREG8, and EREG12, ECCE1 includes EREG1, EREG5, EREG9, and EREG13; ECCE2 includes EREG2, EREG6, EREG10, and EREG14, and ECCE3 includes EREG3, EREG7, EREG11, and EREG15. New mapping obtained by using an offset in the frequency domain of the CRS configuration information of the control channel resource set is shown in the right figure, where ECCE3 includes EREG0, EREG4, EREG8, and EREG12, ECCE0 includes EREG1, EREG5, EREG9, and EREG13, ECCE1 includes EREG2, EREG6, EREG10, and EREG14, and ECCE2 includes EREG3, EREG7, EREG11, and EREG15.

As a third feasible implementation manner, a UE may acquire, according to the index number of the control channel resource set and/or the index number of the first physical resource block PRB of the control channel resource set, at least one type of the following information corresponding to the different control channel resource sets: pilot port information, information about a mapping relationship between an enhanced control channel element and an enhanced resource element group, and information about a mapping relationship between an enhanced resource element group and a resource element.

Specifically, the UE may obtain a pilot port number according to a function of the index number of the control channel resource set and a function of the index number of the first physical resource block PRB of the control channel resource set, or obtain a pilot port number according to a function of the index number of the control channel resource set, or obtain a pilot port number according to a function of the index number of the first physical resource block PRB of the control channel resource set.

Figures 4, 5:
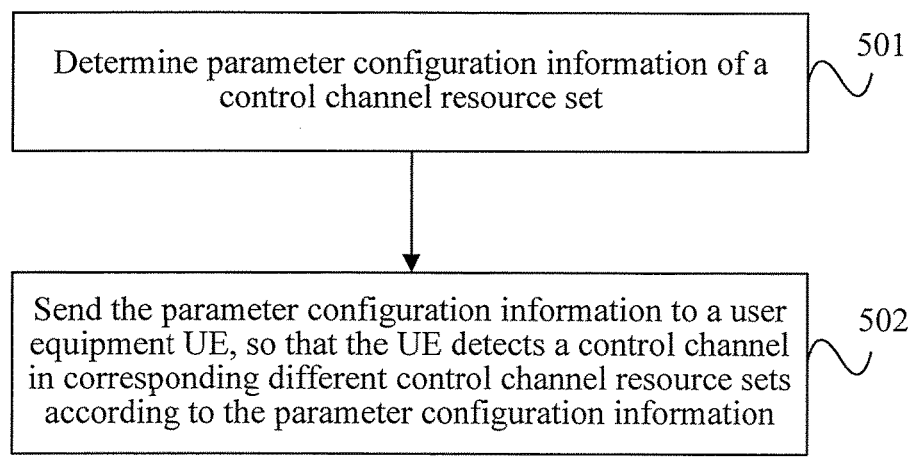
FIG. 4 is a schematic diagram showing a mapping relationship that is obtained by using an index number and is between an enhanced resource element group and a resource element according to Embodiment 1 of the present invention.
FIG. 5 is a schematic flowchart of Embodiment 2 of a control channel detection method according to the present invention.

The information about a mapping relationship between an enhanced resource element group and a resource element of each control channel resource set is obtained according to the index number of the control channel resource set and/or the index number of the first physical resource block PRB of the control channel resource set. FIG. 4 is a schematic diagram showing a mapping relationship that is obtained by using an index number and is between an enhanced resource element group and a resource element according to Embodiment 1 of the present invention. As shown in FIG. 4, each row represents one subcarrier, each column represents one OFDM symbol, and EREG sequence numbers are successively mapped to each PRB in a sequence of frequency domain first and then time domain. In FIG. 4, mapping starts from EREG0, that is, from the first position. Modulo operation is performed on the number of subcarriers in each PRB using an index number of each control channel resource set or an index number of a first PRB included in each control channel resource set, to obtain a first parameter, and then with regard to FIG. 4, a time-frequency diagram of the mapping relationship between an enhanced resource element group and a resource element has a cyclic shift by one first parameter during mapping, where the cyclic shift may be performed in each OFDM symbol.

The information about a mapping relationship between an enhanced control channel element and an enhanced resource element group of each control channel resource set is obtained according to the index number of the control channel resource set and/or the index number of the first physical resource block PRB of the control channel resource set. An implementation principle thereof is similar to the implementation principle shown in the schematic diagram of FIG. 3, which is not described herein again.

As a fourth feasible implementation manner, a UE may receive demodulation pilot sequence initialization identities IDs that are sent by a base station and are corresponding to the different control channel resource sets; and acquire, according to the demodulation pilot sequence initialization IDs, at least one type of the following information corresponding to the different control channel resource sets: pilot port information, information about a mapping relationship between an enhanced control channel element and an enhanced resource element group, and information about a mapping relationship between an enhanced resource element group and a resource element.

Specifically, the demodulation pilot sequence initialization identity ID is $N_{ID}^{(i)}$, where i is an index number of a control channel resource set; the pilot port information is obtained according to the demodulation pilot sequence initialization ID, that is, a used port is a function of $N_{ID}^{(i)}$. For example, when $N_{ID}^{(i)}$ is an odd number, an EREG of a control channel that performs discrete transmission uses a port 107 and a port 109 for transmission; when $N_{ID}^{(i)}$ is an even number, the EREG of the control channel that performs discrete transmission uses a port 108 and a port 110 for transmission.

The information about a mapping relationship between an enhanced control channel element and an enhanced resource element group and the information about a mapping relationship between an enhanced resource element group and a resource element are obtained according to the demodulation pilot sequence initialization ID, and an implementation principle thereof is similar to an implementation principle shown in the schematic diagrams of FIG. 2 and FIG. 3, which is not described herein again.

As a fifth feasible implementation manner, a UE may receive the ZP CSI-RS configuration information and/or the NZP CSI-RS configuration information sent by a base station and corresponding to the different control channel resource sets; and acquire, according to the ZP CSI-RS configuration information and/or the NZP CSI-RS configuration information, at least one type of the following information corresponding to the different control channel resource sets: pilot port information, information about a mapping relationship between an enhanced control channel element and an enhanced resource element group, and information about a mapping relationship between an enhanced resource element group and a resource element. That is, at least one type of the foregoing information can be obtained according to a function of the ZP CSI-RS configuration information and/or a function of the NZP CSI-RS configuration information.

S102: Detect a control channel in the corresponding different control channel resource sets according to the parameter configuration information.

After acquiring the parameter configuration information corresponding to the different control channel resource sets, the UE detects a control channel in the corresponding different control channel resource sets according to the parameter configuration information.

In the first feasible implementation manner of step S101, the subframe configuration information includes at least one type of the following information: indication information that blind detection is performed in a configured subframe on search space of a first control channel or a second control channel in each control channel resource set; special subframe configuration information; time division duplex (Time Division Duplex, hereinafter referred to as TDD) uplink-downlink subframe configuration information; information about a subframe in which a positioning pilot is located; and information about a subframe in which a multicast channel is located.

The indication information that blind detection is performed in a configured subframe on search space of a first control channel or a second control channel in each control channel resource set specifically includes the following several cases:

In the following several cases, the first control channel may be an EPDCCH, and the second control channel may be a PDCCH.

In a first case, if detection, in a current subframe, of UE specific search space of the first control channel is configured in subframe configuration information of each of two control channel resource sets, a candidate control channel of the first control channel is detected in both of the two control channel resource sets, where each control channel resource set has at least one candidate control channel of the first control channel.

In a second case, if detection, in a current subframe, of UE specific search space of the second control channel is configured in subframe configuration information of each of two control channel resource sets, detection is performed in the UE specific search space of the second control channel.

In a third case, if detection, in a current subframe, of UE specific search space of the first control channel is configured in subframe configuration information of a first control channel resource set and detection, in a current subframe, of UE specific search space of the second control channel is configured in subframe configuration information of a second control channel resource set, the UE specific search space of the first control channel is detected in the first control channel resource set, and the UE specific search space of the second control channel is detected in the first control channel resource set, where there is at least one candidate control channel in the UE specific search space of the first control channel, there is at least one candidate control channel in the UE specific search space of the second control channel, and the total number of candidate control channels in the UE specific search space of the first control channel and the second control channel is not greater than the total number of candidate control channels in UE specific search space.

In a fourth case, if detection, in a current subframe, of UE specific search space of the first control channel is configured in subframe configuration information of a first control channel resource set and detection, in a current subframe, of UE specific search space of the second control channel is configured in subframe configuration information of a second control channel resource set, the UE specific search space of the first control channel is detected in the first control channel resource set, where the number of candidate control channels in the UE specific search space of the first control channel is greater than 1 and is less than the total number of candidate control channels in UE specific search space.

In a fifth case, if detection, in a current subframe, of UE specific search space of the first control channel is configured in subframe configuration information of a first control channel resource set and detection, in a current subframe, of UE specific search space of the second control channel is configured in subframe configuration information of a second control channel resource set, the UE specific search space of the first control channel is detected in the first control channel resource set, where the number of candidate control channels in the UE specific search space of the first control channel is equal to the total number of candidate control channels in UE specific search space.

In this embodiment, a UE acquires parameter configuration information corresponding to different control channel resource sets, and detects a control channel in the corresponding different control channel resource sets according to the parameter configuration information. Because different control channel resource sets correspond to different parameter configuration information, a control channel can be detected in the corresponding different control channel resource sets according to the different parameter configuration information, which therefore implements selection of a dynamic node.

FIG. 5 is a schematic flowchart of Embodiment 2 of a control channel detection method according to the present invention. A difference between the embodiment shown in FIG. 5 and the embodiment shown in FIG. 1 lies in that the embodiment shown in FIG. 5 is executed by a base station. As shown in FIG. 5, steps of this embodiment include:

S501: Determine parameter configuration information of a control channel resource set.

Specifically, the base station may determine the parameter configuration information of the control channel resource set in the following several implementation manners.

As a feasible implementation manner, the base station determines at least one type of the following information corresponding to the control channel resource set: pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information.

The subframe configuration information includes at least one type of the following information: indication information that blind detection is performed in a configured subframe on search space of a first control channel or a second control channel in each control channel resource set; special subframe configuration information; time division duplex TDD uplink-downlink subframe configuration information; information about a subframe in which a positioning pilot is located; and information about a subframe in which a multicast channel is located.

As a second feasible implementation manner, the base station determines a demodulation pilot sequence initialization identity ID corresponding to the control channel resource set. The demodulation pilot sequence initialization identity ID may be represented by $N_{ID}^{(i)}$, so that a UE obtains at least one type of the following information according to a function of $N_{ID}^{(i)}$: pilot port information, information about a mapping relationship between an enhanced control channel element and an enhanced resource element group, and information about a mapping relationship between an enhanced resource element group and a resource element.

As a third feasible implementation manner, the base station determines a ZP CSI-RS configuration parameter and/or an NZP CSI-RS configuration parameter corresponding to the control channel resource set, so that a UE obtains at least one type of the following information according to the ZP CSI-RS configuration parameter and/or the NZP CSI-RS configuration parameter: pilot port information, information about a mapping relationship between an enhanced control channel element and an enhanced resource element group, and information about a mapping relationship between an enhanced resource element group and a resource element.

As a fourth feasible implementation manner, the base station determines a CRS configuration parameter corresponding to the control channel resource set, so that a UE obtains at least one type of the following information according to the CRS configuration parameter: pilot port information, information about a mapping relationship between an enhanced control channel element and an enhanced resource element group, and information about a mapping relationship between an enhanced resource element group and a resource element.

S502: Send the parameter configuration information to a user equipment UE, so that the UE detects a control channel in corresponding different control channel resource sets according to the parameter configuration information.

The base station sends at least one type of the parameter configuration information determined in various feasible implementation manners in step S501 to the UE, so that the UE detects a control channel in the corresponding different control channel resource sets according to the parameter configuration information.

Optionally, the base station may send the parameter configuration information determined in step S501 to the UE by sending broadcast signaling or RRC signaling including the parameter configuration information to the UE.

In this embodiment, a base station determines parameter configuration information of a control channel resource set, and sends the parameter configuration information to a user equipment UE, so that the UE detects a control channel in corresponding different control channel resource sets according to the parameter configuration information, which therefore implements dynamic selection of a node.

Figure 6:
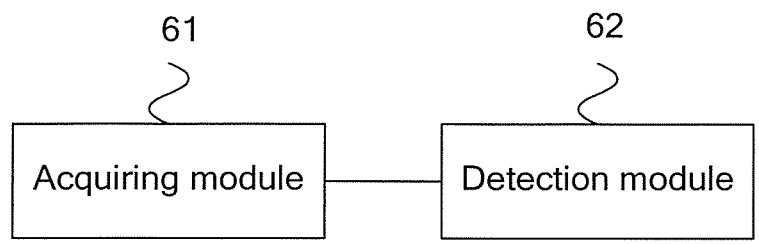
FIG. 6 is a schematic structural diagram of Embodiment 1 of a user equipment according to the present invention.

FIG. 6 is a schematic structural diagram of Embodiment 1 of a user equipment according to the present invention. As shown in FIG. 6, the user equipment in this embodiment includes an acquiring module 61 and a detection module 62, where the acquiring module 61 is configured to acquire parameter configuration information corresponding to different control channel resource sets, and the detection module 62 is configured to detect a control channel in the corresponding different control channel resource sets according to the parameter configuration information.

Further, the acquiring module 61 is specifically configured to: receive the parameter configuration information corresponding to the different control channel resource sets that is sent by a base station, where the parameter configuration information includes at least one type of the following information:

pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information; and perform rate de-matching according to the ZP CSI-RS configuration information.

Further, the acquiring module 61 is specifically configured to acquire, according to an index number of the control channel resource set and/or an index number of a first physical resource block PRB of the control channel resource set, at least one type of the following information corresponding to the different control channel resource sets:

pilot port information, information about a mapping relationship between an enhanced control channel element and an enhanced resource element group, and information about a mapping relationship between an enhanced resource element group and a resource element.

Further, the acquiring module 61 is specifically configured to: receive demodulation pilot sequence initialization identities IDs that are sent by a base station and are corresponding to the different control channel resource sets; and acquire, according to the demodulation pilot sequence initialization IDs, at least one type of the following information corresponding to the different control channel resource sets:

pilot port information, information about a mapping relationship between an enhanced control channel element and an enhanced resource element group, and information about a mapping relationship between an enhanced resource element group and a resource element.

Further, the acquiring module 61 is specifically configured to: receive ZP CSI-RS configuration information and/or NZP CSI-RS configuration information sent by a base station and corresponding to the different control channel resource sets; and acquire, according to the ZP CSI-RS configuration information and/or the NZP CSI-RS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

Further, the acquiring module 61 is specifically configured to: receive cell-specific reference signal CRS configuration information corresponding to the different control channel resource sets that is sent by a base station; and acquire, according to the CRS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

Further, the subframe configuration information includes at least one type of the following information:

indication information that blind detection is performed in a configured subframe on search space of a first control channel or a second control channel in each control channel resource set; special subframe configuration information; time division duplex TDD uplink-downlink subframe configuration information; information about a subframe in which a positioning pilot is located; and information about a subframe in which a multicast channel is located.

Further, the detection module 62 is specifically configured to: if detection, in a current subframe, of UE specific search space of the first control channel is configured in subframe configuration information of each of two control channel resource sets, detect a candidate control channel of the first control channel in both of the two control channel resource sets, where each control channel resource set has at least one candidate control channel of the first control channel; and further, the detection module 62 is specifically configured to: if detection, in the subframe, of UE specific search space of the second control channel is configured in the subframe configuration information of each of the two control channel resource sets, perform detection in the UE specific search space of the second control channel.

Further, the detection module 62 is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, and perform detection in the UE specific search space of the second control channel in the second control channel resource set, where there is at least one candidate control channel in the UE specific search space of the first control channel, there is at least one candidate control channel in the UE specific search space of the second control channel, and the total number of candidate control channels in the UE specific search space of the first control channel and the second control channel is not greater than the total number of candidate control channels in UE specific search space.

Further, the detection module 62 is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, where the number of candidate control channels in the UE specific search space of the first control channel is greater than 1 and is less than the total number of candidate control channels in UE specific search space.

Further, the detection module 62 is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, where the number of candidate control channels in the UE specific search space of the first control channel is equal to the total number of candidate control channels in UE specific search space.

Further, the first control channel is an enhanced physical downlink control channel EPDCCH, and the second control channel is a physical downlink control channel PDCCH.

Further, the acquiring module 61 is specifically configured to receive broadcast signaling or RRC signaling that is sent by the base station and includes the parameter configuration information.

The modules of the user equipment in this embodiment can correspondingly execute the technical solutions of the method embodiment shown in FIG. 1, implementation principles and technical effects of this embodiment are similar to those of the method embodiment, and the details are not described herein again.

Figure 7:
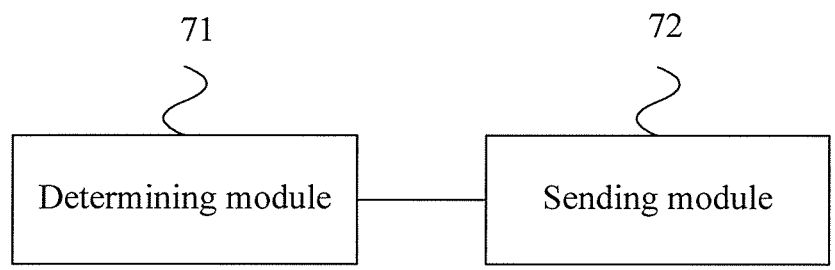
FIG. 7 is a schematic structural diagram of Embodiment 1 of a base station according to the present invention.

FIG. 7 is a schematic structural diagram of Embodiment 1 of a base station according to the present invention. As shown in FIG. 7, the base station of this embodiment includes a determining module 71 and a sending module 72, where the determining module 71 is configured to determine parameter configuration information of a control channel resource set, and the sending module 72 is configured to send the parameter configuration information to a user equipment UE, so that the UE detects a control channel in corresponding different control channel resource sets according to the parameter configuration information.

Further, the determining module 71 is specifically configured to determine at least one type of the following information corresponding to the control channel resource set: pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information.

Further, the determining module 71 is specifically configured to determine a demodulation pilot sequence initialization identity ID corresponding to the control channel resource set.

Further, the determining module 71 is specifically configured to determine a ZP CSI-RS configuration parameter and/or an NZP CSI-RS configuration parameter corresponding to the control channel resource set.

Further, the determining module 71 is specifically configured to determine a cell-specific reference signal CRS configuration parameter corresponding to the control channel resource set.

Further, the subframe configuration information includes at least one type of the following information:

indication information that blind detection is performed in a configured subframe on search space of a first control channel or a second control channel in each control channel resource set; special subframe configuration information; time division duplex TDD uplink-downlink subframe configuration information; information about a subframe in which a positioning pilot is located; and information about a subframe in which a multicast channel is located.

Further, the sending module 72 is specifically configured to send broadcast signaling or RRC signaling including the parameter configuration information to the UE.

The modules of the base station in this embodiment can correspondingly execute the technical solutions of the method embodiment shown in FIG. 5, implementation principles and technical effects of this embodiment are similar to those of the method embodiment, and the details are not described herein again.

Figure 8:
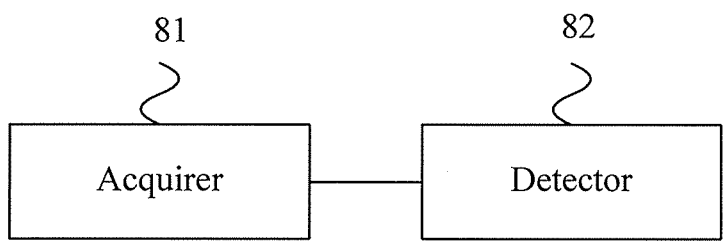
FIG. 8 is a schematic structural diagram of Embodiment 2 of a user equipment according to the present invention.

FIG. 8 is a schematic structural diagram of Embodiment 2 of a user equipment according to the present invention. As shown in FIG. 8, the user equipment in this embodiment includes an acquirer 81 and a detector 82, where the acquirer 81 is configured to acquire parameter configuration information corresponding to different control channel resource sets, and the detector 82 is configured to detect a control channel in the corresponding different control channel resource sets according to the parameter configuration information.

Further, the acquirer 81 is specifically configured to: receive the parameter configuration information corresponding to the different control channel resource sets that is sent by a base station, where the parameter configuration information includes at least one type of the following information: pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information; and perform rate de-matching according to the ZP CSI-RS configuration information.

Further, the acquirer 81 is specifically configured to acquire, according to an index number of the control channel resource set and/or an index number of a first physical resource block PRB of the control channel resource set, at least one type of the following information corresponding to the different control channel resource sets:

pilot port information, information about a mapping relationship between an enhanced control channel element and an enhanced resource element group, and information about a mapping relationship between an enhanced resource element group and a resource element.

Further, the acquirer 81 is specifically configured to: receive demodulation pilot sequence initialization identities IDs that are sent by the base station and are corresponding to the different control channel resource sets; and acquire, according to the demodulation pilot sequence initialization IDs, at least one type of the following information corresponding to the different control channel resource sets:

pilot port information, information about a mapping relationship between an enhanced control channel element and an enhanced resource element group, and information about a mapping relationship between an enhanced resource element group and a resource element.

Further, the acquirer 81 is specifically configured to: receive ZP CSI-RS configuration information and/or NZP CSI-RS configuration information sent by the base station and corresponding to the different control channel resource sets; and acquire, according to the ZP CSI-RS configuration information and/or the NZP CSI-RS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

Further, the acquirer 81 is specifically configured to: receive cell-specific reference signal CRS configuration information corresponding to the different control channel resource sets that is sent by the base station; and acquire, according to the CRS configuration information, at least one type of the following information corresponding to the different control channel resource sets:

pilot port information, information about a mapping relationship between an enhanced control channel element and an enhanced resource element group, and information about a mapping relationship between an enhanced resource element group and a resource element.

Further, the subframe configuration information includes at least one type of the following information:

indication information that blind detection is performed in a configured subframe on search space of a first control channel or a second control channel in each control channel resource set; special subframe configuration information; time division duplex TDD uplink-downlink subframe configuration information; information about a subframe in which a positioning pilot is located; and information about a subframe in which a multicast channel is located.

Further, the detector 82 is specifically configured to: if detection, in a current subframe, of UE specific search space of the first control channel is configured in subframe configuration information of each of two control channel resource sets, detect a candidate control channel of the first control channel in both of the two control channel resource sets, where each control channel resource set has at least one candidate control channel of the first control channel; and further, the detector 82 is specifically configured to: if detection, in the subframe, of UE specific search space of the second control channel is configured in the subframe configuration information of each of the two control channel resource sets, perform detection in the UE specific search space of the second control channel.

Further, the detector 82 is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, and perform detection in the UE specific search space of the second control channel in the second control channel resource set, where there is at least one candidate control channel in the UE specific search space of the first control channel, there is at least one candidate control channel in the UE specific search space of the second control channel, and the total number of candidate control channels in the UE specific search space of the first control channel and the second control channel is not greater than the total number of candidate control channels in UE specific search space.

Further, the detector 82 is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, where the number of candidate control channels in the UE specific search space of the first control channel is greater than 1 and is less than the total number of candidate control channels in UE specific search space.

Further, the detector 82 is specifically configured to: if detection, in a current subframe, of UE specific search space of the first control channel is configured in subframe configuration information of a first control channel resource set and detection, in a current subframe, of UE specific search space of the second control channel is configured in subframe configuration information of a second control channel resource set, perform detection in the UE specific search space of the first control channel in the first control channel resource set, where the number of candidate control channels in the UE specific search space of the first control channel is equal to the total number of candidate control channels in UE specific search space.

Further, the first control channel is an enhanced physical downlink control channel EPDCCH, and the second control channel is a physical downlink control channel PDCCH.

Further, the acquirer 81 is specifically configured to receive broadcast signaling or RRC signaling that is sent by the base station and includes the parameter configuration information.

The modules of the user equipment in this embodiment can correspondingly execute the technical solutions of the method embodiment shown in FIG. 1, implementation principles and technical effects of this embodiment are similar to those of the method embodiment, and the details are not described herein again.

Figure 9:
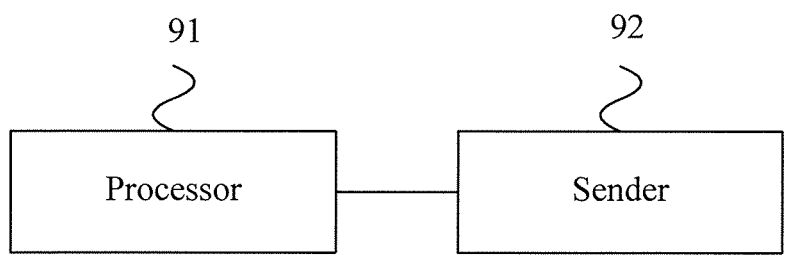
FIG. 9 is a schematic structural diagram of Embodiment 2 of a base station according to the present invention.

FIG. 9 is a schematic structural diagram of Embodiment 2 of a base station according to the present invention. As shown in FIG. 9, the base station shown in this embodiment includes a processor 91 and a sender 92, where the processor 91 is configured to determine parameter configuration information of a control channel resource set, and the sender 92 is configured to send the parameter configuration information to a user equipment UE, so that the UE detects a control channel in corresponding different control channel resource sets according to the parameter configuration information.

Further, the processor 91 is specifically configured to determine at least one type of the following information corresponding to the control channel resource set: pilot port information, zero power channel state information-reference signal ZP CSI-RS configuration information, non zero power channel state information-reference signal NZP CSI-RS configuration information, information about a mapping relationship between an enhanced control channel element and an enhanced resource element group, information about a mapping relationship between an enhanced resource element group and a resource element, and subframe configuration information.

Further, the processor 91 is specifically configured to determine a demodulation pilot sequence initialization identity ID corresponding to the control channel resource set.

Further, the processor 91 is specifically configured to determine a ZP CSI-RS configuration parameter and/or an NZP CSI-RS configuration parameter corresponding to the control channel resource set.

Further, the processor 91 is specifically configured to determine a cell-specific reference signal CRS configuration parameter corresponding to the control channel resource set.

Further, the subframe configuration information includes at least one type of the following information:
indication information that blind detection is performed in a configured subframe on search space of a first control channel or a second control channel in each control channel resource set; special subframe configuration information; time division duplex TDD uplink-downlink subframe configuration information; information about a subframe in which a positioning pilot is located; and information about a subframe in which a multicast channel is located.

Further, the sender 92 is specifically configured to send broadcast signaling or RRC signaling including the parameter configuration information to the UE.

The modules of the base station in this embodiment can correspondingly execute the technical solutions of the method embodiment shown in FIG. 5, implementation principles and technical effects of this embodiment are similar to those of the method embodiment, and the details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A control channel detection method, comprising:
receiving, from a base station, parameter configuration information corresponding to different control channel resource sets, including performing rate de-matching according to zero power channel state information-reference signal (ZP CSI-RS) configuration information, wherein the parameter configuration information comprises information about a mapping relationship between an enhanced control channel element and an enhanced resource element group and comprises the ZP CSI-RS configuration information; and
detecting a control channel in the corresponding different control channel resource sets according to the parameter configuration information.

2. The method according to claim 1,
wherein the parameter configuration information further comprises at least one type of the following information:
non-zero power channel state information-reference signal (NZP CSI-RS) configuration information or subframe configuration information.

3. The method according to claim 1, wherein acquiring parameter configuration information corresponding to the different control channel resource sets also includes acquiring the parameter configuration information corresponding to different control channel resource sets according to an index number of the control channel resource set and/or an index number of a first physical resource block (PRB) of the control channel resource set.

4. The method according to claim 1, wherein acquiring parameter configuration information corresponding to different control channel resource sets also includes:
receiving demodulation pilot sequence initialization identities (IDs) that are sent by a base station and are corresponding to the different control channel resource sets; and
acquiring, according to the demodulation pilot sequence initialization IDs, the parameter configuration information corresponding to the different control channel resource sets.

5. The method according to claim 1, wherein acquiring parameter configuration information corresponding to different control channel resource sets also includes:
receiving non-zero power channel state information-reference signal (NZP CSI-RS) configuration information sent by the base station and corresponding to the different control channel resource sets; and
acquiring, according to the ZP CSI-RS configuration information and/or the NZP CSI-RS configuration information, the parameter configuration information.

6. The method according to claim 1, wherein acquiring parameter configuration information corresponding to different control channel resource sets comprises:
receiving cell-specific reference signal (CRS) configuration information corresponding to the different control channel resource sets that is sent by a base station; and
acquiring, according to the CRS configuration information, the parameter configuration information corresponding to the different control channel resource sets.

7. The method according to claim 2, wherein the subframe configuration information comprises at least one type of the following information:
indication information that blind detection is performed in a configured subframe on search space of a first control channel or a second control channel in each control channel resource set, wherein the first control channel is an enhanced physical downlink control channel (EPDCCH), and the second control channel is a physical downlink control channel (PDCCH);
special subframe configuration information;
time division duplex (TDD) uplink-downlink subframe configuration information;
information about a subframe in which a positioning pilot is located; and
information about a subframe in which a multicast channel is located.

8. The method according to claim 7, wherein detecting the control channel in the corresponding different control channel resource sets according to the parameter configuration information comprises:
when, in a current subframe, of user equipment (UE) specific search space of the first control channel is configured in subframe configuration information of each of two control channel resource sets, detecting a candidate control channel of the first control channel in both of the two control channel resource sets, wherein each control channel resource set has at least one candidate control channel of the first control channel; and when, in the subframe, of UE specific search space of the second control channel is configured in the subframe configuration information of each of the two control channel resource sets, performing detection in the UE specific search space of the second control channel.

9. The method according to claim 7, wherein detecting the control channel in the corresponding different control channel resource sets according to the parameter configuration information comprises:

when detection, in a current subframe, of user equipment (UE) specific search space of the first control channel is configured in subframe configuration information of a first control channel resource set and detection, in a current subframe, of UE specific search space of the second control channel is configured in subframe configuration information of a second control channel resource set:

performing detection in the UE specific search space of the first control channel in the first control channel resource set; and performing detection in the UE specific search space of the second control channel in the second control channel resource set, wherein there is at least one candidate control channel in the UE specific search space of the first control channel, there is at least one candidate control channel in the UE specific search space of the second control channel, and the total number of candidate control channels in the UE specific search space of the first control channel and the second control channel is not greater than the total number of candidate control channels in UE specific search space.

10. The method according to claim 7, wherein detecting the control channel in the corresponding different control channel resource sets according to the parameter configuration information comprises:

when detection, in a current subframe, of user equipment (UE) specific search space of the first control channel is configured in subframe configuration information of a first control channel resource set and detection, in a current subframe, of UE specific search space of the second control channel is configured in subframe configuration information of a second control channel resource set:

performing detection in the UE specific search space of the first control channel in the first control channel resource set, wherein the number of candidate control channels in the UE specific search space of the first control channel is greater than 1 and is less than the total number of candidate control channels in UE specific search space.

11. The method according to claim 7, wherein detecting the control channel in the corresponding different control channel resource sets according to the parameter configuration information comprises:

when detection, in a current subframe, of user equipment (UE) specific search space of the first control channel is configured in subframe configuration information of a first control channel resource set and detection, in a current subframe, of UE specific search space of the second control channel is configured in subframe configuration information of a second control channel resource set:

performing detection in the UE specific search space of the first control channel in the first control channel resource set, wherein the number of candidate control channels in the UE specific search space of the first control channel is equal to the total number of candidate control channels in UE specific search space.

12. A control channel detection method, comprising:

determining parameter configuration information of a control channel resource set, wherein the parameter configuration information comprises information about a mapping relationship between an enhanced control channel element and an enhanced resource element group and at least one type of the following information corresponding to the control channel resource set: zero power channel state information-reference signal (ZP CSI-RS) configuration information, non-zero power channel state information-reference signal (NZP CSI-RS) configuration information, and subframe configuration information; and sending the parameter configuration information to a user equipment (UE), so that the UE detects a control channel in corresponding different control channel resource sets according to the parameter configuration information.

13. The method according to claim 12, wherein determining parameter configuration information of a control channel resource set comprises:

determining a demodulation pilot sequence initialization identity ID corresponding to the control channel resource set.

14. The method according to claim 12, wherein determining parameter configuration information of a control channel resource set comprises:

determining a ZP CSI-RS configuration parameter and/or a NZP CSI-RS configuration parameter corresponding to the control channel resource set.

15. The method according to claim 12, wherein determining parameter configuration information of a control channel resource set comprises:

determining a cell-specific reference signal (CRS) configuration parameter corresponding to the control channel resource set.

16. The method according to claim 12, wherein the subframe configuration information comprises at least one type of the following information:

indication information that blind detection is performed in a configured subframe on search space of a first control channel or a second control channel in each control channel resource set;

special subframe configuration information;

time division duplex (TDD) uplink-downlink subframe configuration information;

information about a subframe in which a positioning pilot is located; and information about a subframe in which a multicast channel is located.

17. A user equipment, comprising:

a processor; and a memory in communication with the processor, wherein the processor is configured to:

receive, from a base station, parameter configuration information corresponding to different control channel resource sets, including performing rate de-matching according to zero power channel state information-reference signal (ZP CSI-RS) configuration information, wherein the parameter configuration information comprises information about a mapping relationship between an enhanced control channel element and an enhanced resource element group and comprises the ZP CSI-RS configuration information; and detect a control channel in the corresponding different control channel resource sets according to the parameter configuration information.

18. The user equipment according to claim 17, wherein the parameter configuration information also comprises at least one type of the following information:

non-zero power channel state information-reference signal (NZP CSI-RS) configuration information or subframe configuration information.

19. The user equipment according to claim 17, wherein the processor is further configured to:

acquire the parameter configuration information corresponding to the different control channel resource sets according to an index number of the control channel resource set and/or an index number of a first physical resource block PRB of the control channel resource set.

20. The user equipment according to claim 17, wherein the processor is further configured to:

receive demodulation pilot sequence initialization identities IDs that are sent by the base station and are corresponding to the different control channel resource sets; and acquire, according to the demodulation pilot sequence initialization IDs, at least one type of the parameter configuration information corresponding to the different control channel resource sets.

21. The user equipment according to claim 17, wherein the processor is further configured to:

receive non-zero power channel state information-reference signal (NZP CSI-RS) configuration information sent by the base station and corresponding to the different control channel resource sets; and acquire, according to the ZP CSI-RS configuration information and/or the NZP CSI-RS configuration information, the parameter configuration information corresponding to the different control channel resource sets.

22. The user equipment according to claim 17, wherein the processor is further configured to:

receive cell-specific reference signal (CRS) configuration information corresponding to the different control channel resource sets that is sent by the base station; and acquire, according to the CRS configuration information, the parameter configuration information corresponding to the different control channel resource sets.

23. The user equipment according to claim 18, wherein the subframe configuration information comprises at least one type of the following information:

indication information that blind detection is performed in a configured subframe on search space of a first control channel or a second control channel in each control channel resource set, wherein the first control channel is an enhanced physical downlink control channel (EPDCCH), and the second control channel is a physical downlink control channel (PDCCH);

special subframe configuration information;

time division duplex (TDD) uplink-downlink subframe configuration information;

information about a subframe in which a positioning pilot is located; and information about a subframe in which a multicast channel is located.

24. The user equipment according to claim 23, wherein the processor is further configured to:

when detection, in a current subframe, of user equipment (UE) specific search space of the first control channel is configured in subframe configuration information of each of two control channel resource sets, detect a candidate control channel of the first control channel in both of the two control channel resource sets, wherein each control channel resource set has at least one candidate control channel of the first control channel; and when detection, in the subframe, of UE specific search space of the second control channel is configured in the subframe configuration information of each of the two control channel resource sets, perform detection in the UE specific search space of the second control channel.

25. The user equipment according to claim 23, wherein the processor is further configured to:

when detection, in a current subframe, of user equipment (UE) specific search space of the first control channel is configured in subframe configuration information of a first control channel resource set and detection, in a current subframe, of UE specific search space of the second control channel is configured in subframe configuration information of a second control channel resource set:

perform detection in the UE specific search space of the first control channel in the first control channel resource set, and perform detection in the UE specific search space of the second control channel in the second control channel resource set, wherein there is at least one candidate control channel in the UE specific search space of the first control channel, there is at least one candidate control channel in the UE specific search space of the second control channel, and the total number of candidate control channels in the UE specific search space of the first control channel and the second control channel is not greater than the total number of candidate control channels in UE specific search space.

26. The user equipment according to claim 23, wherein the processor is further configured to:

when detection, in a current subframe, of user equipment (UE) specific search space of the first control channel is configured in subframe configuration information of a first control channel resource set and detection, in a current subframe, of UE specific search space of the second control channel is configured in subframe configuration information of a second control channel resource set:

perform detection in the UE specific search space of the first control channel in the first control channel resource set, wherein the number of candidate control channels in the UE specific search space of the first control channel is greater than 1 and is less than the total number of candidate control channels in UE specific search space.

27. The user equipment according to claim 23, wherein the processor is further configured to:

when detection, in a current subframe, of user equipment (UE) specific search space of the first control channel is configured in subframe configuration information of a first control channel resource set and detection, in a current subframe, of UE specific search space of the second control channel is configured in subframe configuration information of a second control channel resource set:
    perform detection in the UE specific search space of the first control channel in the first control channel resource set, wherein the number of candidate control channels in the UE specific search space of the first control channel is equal to the total number of candidate control channels in UE specific search space.

28. A base station, comprising:
a processor, configured to:
    determine parameter configuration information of a control channel resource set, wherein the parameter configuration information comprises information about a mapping relationship between an enhanced control channel element and an enhanced resource element group; and
    determine at least one type of the following information corresponding to the control channel resource set: zero power channel state information-reference signal (ZP CSI-RS) configuration information, non-zero power channel state information-reference signal (NZP CSI-RS) configuration information, and subframe configuration information; and
a sender, configured to send the parameter configuration information to a user equipment (UE), so that the UE detects a control channel in corresponding different control channel resource sets according to the parameter configuration information.

29. The base station according to claim 28, wherein the processor is configured to determine a demodulation pilot sequence initialization identity (ID) corresponding to the control channel resource set.

30. The base station according to claim 28, wherein the processor is configured to determine a ZP CSI-RS configuration parameter and/or a NZP CSI-RS configuration parameter corresponding to the control channel resource set.

31. The base station according to claim 28, wherein the processor is configured to determine a cell-specific reference signal (CRS) configuration parameter corresponding to the control channel resource set.

32. The base station according to claim 28, wherein the subframe configuration information comprises at least one type of the following information:
    indication information that blind detection is performed in a configured subframe on search space of a first control channel or a second control channel in each control channel resource set;
    special subframe configuration information;
    time division duplex (TDD) uplink-downlink subframe configuration information;
    information about a subframe in which a positioning pilot is located; and
    information about a subframe in which a multicast channel is located.

* * * * *